United States Patent [19]

Wright

[11] 3,951,723

[45] Apr. 20, 1976

[54] BONDING FIBERS TO RUBBER WITH RESOL CONDENSATES OF UNSATURATE-RESORCINOL POLYMERS

[75] Inventor: Robert Lee Wright, Fairlawn, Ohio

[73] Assignee: Monsanto Company, St. Louis, Mo.

[22] Filed: Apr. 25, 1974

[21] Appl. No.: 464,039

Related U.S. Application Data

[60] Division of Ser. No. 255,851, May 22, 1972, Pat. No. 3,812,068, which is a continuation-in-part of Ser. No. 186,782, Oct. 5, 1971, abandoned, which is a continuation-in-part of Ser. No. 159,453, July 2, 1971, abandoned, which is a continuation-in-part of Ser. No. 59,720, July 30, 1970, abandoned.

[52] U.S. Cl. ............................ 156/331; 152/361 R; 156/110 A; 156/124; 427/385; 427/388; 427/393; 427/407; 427/408; 427/409; 427/413; 428/375; 428/379; 428/380; 428/382; 428/394; 428/395

[51] Int. Cl.$^2$ ................ B05D 3/02; B32B 25/08

[58] Field of Search............. 117/138.8 F, 132 BF, 117/128.4, 138.8 N, 145, 143 A, 71 M, 75, 161 UH, 161 L, 161 UT; 156/335, 110 A, 124; 260/29.3, 62, 847, 848, 54; 152/361 R; 427/385, 388, 393, 407, 408, 409, 413; 428/375, 379, 380, 382, 394, 395

[56] References Cited

UNITED STATES PATENTS

| | | | |
|---|---|---|---|
| 3,518,315 | 6/1970 | Smutny | 260/62 X |
| 3,549,576 | 12/1970 | Anderson et al. | 260/29.3 |
| 3,637,430 | 1/1972 | Dahms et al. | 260/29.3 X |
| 3,644,268 | 2/1972 | Morita | 260/38 |
| 3,698,935 | 10/1972 | Yurcick et al. | 117/76 T |
| 3,705,868 | 12/1972 | Honda et al. | 260/29.3 X |
| 3,712,826 | 1/1973 | Kimuro et al. | 117/71 M |
| 3,775,150 | 11/1973 | McClary | 156/335 X |
| 3,812,068 | 5/1974 | Wright | 260/29.3 |
| 3,816,361 | 6/1974 | Morita | 156/335 X |
| 3,817,778 | 6/1974 | Wright | 117/132 BF |

*Primary Examiner*—Harry J. Gwinnell

[57] ABSTRACT

Unsaturate-resorcinol polymers comprising alkylene-bridged resorcinol units resulting from introducing olefinic unsaturated radicals of 3–10 carbon atoms into the nucleus of the resorcinol are condensed with resol which condensation products are adhesives for bonding textiles material to rubber.

40 Claims, No Drawings

BONDING FIBERS TO RUBBER WITH RESOL CONDENSATES OF UNSATURATE-RESORCINOL POLYMERS

REFERENCE TO RELATED APPLICATIONS

This application is a division of application Ser. No. 255,851 filed May 22, 1972, now U.S. Pat. No. 3,812,068, issued May 21, 1974, which is a continuation in part of application Ser. No. 186,782, filed Oct. 5, 1971 now abandoned which is a continuation-in-part of application Ser. No. 159,453, filed July 2, 1971 now abandoned which is a continuation-in-part of application Ser. No. 59,720, filed July 30, 1970 now abandoned.

This invention relates to methods of bonding synthetic fibers to rubber. More particularly the invention relates to improved adhesive compositions and to methods of bonding synthetic fibers to rubber by use of certain thermosetting resinous compositions comprising unsaturate-resorcinol polymers.

BACKGROUND OF THE INVENTION

The development of new synthetic fibers for making fiber-rubber composites has resulted in a continuing problem of bonding the new fibers to rubber. Adhesive compositions, based on resorcinol and formaldehyde were discovered early in the development of the art and achieved commercial acceptance for bonding nylon and rayon fiber to rubber but the adhesives acceptable for bonding rayon and nylon to rubber are not entirely satisfactory for polyester fiber. The adhesives of the present invention are particularly applicable to bonding polyester fiber to rubber. Alkenylresorcinols have heretofore been proposed as fiber bonding agents but are not to be confused with the compositions of the present invention which are polymeric and essentially saturated.

In the preferred method of practicing the invention, the unsaturate-resorcinol polymer is used in conjunction with conventional bonding agents to achieve improved adhesion as compared to the conventional treatment alone. For example, a composition comprising a resorcinol-formaldehyde condensation product and a butadiene-styrene-vinylpyridine latex, called RFL is commonly used to bond synthetic fibers to rubber. The unsaturate-resorcinol polymer resins may advantageously replace the resorcinol in the RFL system to secure improved adhesion.

SUMMARY OF THE INVENTION

The adhesive or adhesive adjuvant of this invention comprises an essentially saturated soluble polymer of resorcinol and an unsaturate. The polymers contain alkylene di-resorcinol units and are believed to be mixtures of polymers which are essentially alkylene-bridged resorcinol molecules of two or more resorcinol units, the alkylene bridge being attached to a carbon atom of the resorcinol nucleus. The nature of the alkylene bridge does not appear to affect the bonding properties of the adhesive compositions made from them. Alkylene bridges of two to eight carbon atoms are similarly effective.

The unsaturate-resorcinol polymers characterized by resorcinol units may be produced by the acidic condensation of resorcinol with an unsaturate. The alkylene bridge may be derived from an unsaturate selected from the group consisting of (1) a halo-olefin of 3 to 10 carbon atoms, (2) a dihalo-olefin of 3 to 10 carbon atoms or (3) an acyclic or cyclic diolefin of 3 to 10 carbon atoms. Acidic conditions favor introduction of an unsaturated group into the resorcinol nucleus and further condensation occurs until no unsaturation remains.

Generally, the reaction may be effected between 50° and 150°C preferably by adding the unsaturate under acidic conditions to resorcinol. Higher temperatures are preferred because the reaction is completed in a shorter time. The reaction may be carried out by adding the unsaturate to molten resorcinol, but it is generally more convenient to conduct the reaction with the resorcinol in an inert solvent. The use of a solvent aids in mixing the reactants, provides a uniform reaction temperature and permits easy removal of by-products. A number of solvents are suitable reaction media; the only requisities are that the solvent does not react with any of the starting materials or products of the reaction and is easily removed from the final product. Xylene is an excellent solvent for this purpose.

The molar ratio of unsaturate to resorcinol is varied from 0.1 to 2.0 moles per mole of resorcinol and suitable thermosetting resins possessing adhesive properties are obtained. However, it is preferred to maintain an excess of resorcinol, that is, use less than one mole of unsaturate per mole of resorcinol. The lower ratio of unsaturate is preferred because as the amount of reactant increases, the solubility of the resinous product decreases. At low unsaturate ratios a water soluble adhesive is obtained, whereas at high unsaturate ratios a water insoluble but organic solvent soluble adhesive is obtained. The optimum ratio is dependent upon the unsaturate used. However, the preferred resins from the standpoint of both adhesion and water solubility are obtained at unsaturate to resorcinol ratios of 0.5/1 or lower. With a difunctional unsaturate like allyl chloride a ratio of 0.3–0.5 mole of unsaturate per mole of resorcinol is conducive to formation of water soluble products. With a trifunctional unsaturate like dichloro butene a ratio of 0.1–0.3 mole of unsaturate per mole of resorcinol is conducive to formation of water soluble products. When using allyl chloride, the olefin to resorcinol ratio of 0.38/1 appears about optimum. When the olefin is 1,4-dichloro-2-butene, the ratio of 0.18/1 appears optimum. In general 0.1 to 0.7 mole of unsaturate per mole of resorcinol produce water soluble resins and higher proportions produce water insoluble resins but there is some overlapping of the ranges.

According to one embodiment of the invention, the unsaturate-resorcinol polymer is condensed with an aldehyde, for example, formaldehyde. For preparation of products which remain water soluble after reaction with formaldehyde the ratio of unsaturate to resorcinol will be 0.1 to 0.6 mole per mole of resorcinol. The condensation with formaldehyde is preferably carried out on a reaction product containing unreacted resorcinol. Unreacted resorcinol remains in the reaction mixture when low unsaturate to resorcinol reactant ratios are used. To obtain a formaldehyde condensation product which is soluble in aqueous ammonia, it is essential that unreacted resorcinol be present. If the unreacted resorcinol is removed by distillation prior to adding formaldehyde to the polymer, an insoluble resin is obtained. The condensation of polymer with amounts of formaldehyde, reduced proportionally to the amount of resorcinol removed, still gives an insoluble resin. The condensation of resorcinol with amounts of formaldehyde, which give water-soluble products when condensed with the reaction mixture, also gives insoluble resins. Only by condensing conjointly with resorcinol and the polymer is an aqueous alkaline soluble adhesive obtained. The condensation with formaldehyde improves the fiber bonding properties. For each mole of resorcinol charged for making the polymer there can be used up to 0.5 mole of formaldehyde without significantly reducing the water solubility of the adhesive. A preferred range is 0.3 to 0.4 mole of formaldehyde for each mole of resorcinol charged regardless of the unsaturate, providing of course, the unsaturate is condensed in a ratio conducive to water soluble products.

According to another embodiment of the invention, the unsaturate-resorcinol polymer is condensed with a phenolaldehyde resol instead of with an aldehyde and water soluble adhesives are obtained. As with the formaldehyde condensation products, the unsaturate-to-resorcinol ratio is between 0.1–0.6 mole per mole of resorcinol. The preferred range varies from unsaturate-to-unsaturate, however, it is essential that unreacted resorcinol remains after the unsaturate is reacted. The amount of phenol-aldehyde resol to be condensed with the resorcinol-resorcinol polymer mixture may contain up to 1.4 moles, but preferably between 0.4–1.0 mole, of phenol for each mole of resorcinol charged for making the polymer. Substituted phenols which will be described later may be used in place of phenol in preparing the resol. The amount of substituted phenols is preferably less than with unsubstituted phenol usually the amount not exceeding 0.6 mole per mole of resorcinol charged. The preferred range of formaldehyde in the resol is between 0.4–1.4 mole of formaldehyde for each mole of resorcinol originally charged. The ratio of phenol/formaldehyde in the resol can be varied considerably as explained below but preferably the ratio is between 1/0.8–1/1.4. The new adhesive obtained by condensation of resols is not to be confused with mere mixtures or formulations of resorcinol-resorcinol polymers and phenol-aldehyde resols. The condensation products are obtained by heating said mixtures and effecting definite reaction of the components.

The phenol-aldehyde resols suitable for reaction with the resorcinol/alkylene di-resorcinol polymer mixture are thermosetting resins prepared by condensing phenol and formaldehyde under basic conditions which are known as "A stage" resins having reactive methylol groups. The formaldehyde-to-phenol ratio for preparing the resol may vary from 0.5 to 3.0 moles formaldehyde per mole of phenol. Generally, the resins are prepared by reacting 0.7–2.5 moles of formaldehyde per mole of phenol with 0.8–1.4 moles of formaldehyde being preferred. The resols prepared with the preferred ratio of reactants are characterized by a molecular weight range of 130 to about 250 with the number average molecular weight of 150. Resins of this type are available under the trademark Resinox. The amount of resol reacted with the resorcinol-resorcinol polymer is determined by the amount of phenol and/or formaldehyde present in the resin. As previously stated, up to 1.4 moles of either phenol or formaldehyde may be present for each mole of resorcinol charged for making the polymer providing the phenol/formaldehyde ratio is between 1/0.8 to 1/1.4. When smaller quantities of resol are reacted, a wider range in the phenol/formaldehyde ratio is satisfactory.

For the practice of this invention an olefin having at least two reactive sites, one of which is an ethylenically unsaturated bond is required. More specifically, a straight, branched chain, or cyclic di-olefin may be used or, a mono-or dihalo-olefin. When using an unsaturate having no halogen present such as di-olefin hydrocarbon it is necessary to add a sufficient quantity of an acid, such as hydrogen chloride, to assure that the reaction is conducted under acidic conditions. When using the halo-olefins no additional acid is required since hydrogen halide is a by-product which maintains acidic conditions in the reaction mixture. An olefin of 3 to 10 carbon atoms is preferred. The addition of other catalysts is not necessary but may be used if desired. Examples of other catalysts are sulfuric acid, acid clay, zinc chloride and cuprous chloride. In the presence of cuprous chloride alkenyl resorcinols form under mild reaction conditions and heating in the presence of resorcinol easily effects an exothermic reaction resulting in formation of the adhesive.

It will be appreciated that a polymer comprising alkylene di-resorcinol units derived from di- and tri-functional unsaturates will have the resorcinol nuclei attached to different carbon atoms of the alkylene bridge so that the nuclei are separated by at least two carbon atoms. Alkylene bridges of two to eight carbon atoms in the chain between the aromatic nuclei are similarly effective although the bridge may contain up to ten carbon atoms because pendant alkyl groups may be present in the alkylene bridge. Functional groups other than olefinic and halogen are preferably absent from the reactant with which resorcinol is condensed. The acyclic or cyclic diolefins are preferably hydrocarbon and the olefin group attached to halogen is preferably hydrocarbon.

Halo-olefins suitable for the practice of this invention are illustrated by 3-chloropropene, 3-chloro-1-butene, 4-chloro-1-butene, 1-chloro-2-butene, 3-chloro-2-methylpropene, 3-chloro-1-pentene, 5-chloro-2-pentene, 4-chloro-2-methyl-2-butene, 4-chloro-1-hexene, 6-chloro-1-hexene, 2-chloro-3-hexene, 1-chloro-3-hexene and their halo counterparts in place of chlorine.

Examples of suitable dihalo-olefins are 1,3-dichloropropene, 2,3-dichloropropene, 1,3-dichloro-2-butene, 1,4-dichloro-2-butene, 1,3-dichloro-1-butene, 1,4-dichloro-1-butene, 3,4-dichloro-1-butene, 1,5-dichloro-1-pentene, 1,3-dichloro-1-pentene, 1,3-dichloro-2-pentene, 1,4-dichloro-2-pentene, 1,5-dichloro-2-pentene, 1,3-dichloro-2-methyl-2-butene, 1,6-dichloro-1-hexene, 1,3-dichloro-3-hexene, 1,4-dichloro-2,3-dimethyl-2-butene and their halo counterparts other than chlorine.

It is understood that the halo-olefin reactant must have at least one reactive halogen, preferably an allylic halogen.

Examples of suitable diolefins are propadiene, 1,3-butadiene, 1,3-pentadiene, 2-methyl-1,3-butadiene, 1,5-hexadiene, 2-methyl-1,3-pentadiene, 4-methyl-1,3-pentadiene, 1,7-octadiene, 5,7-dimethyl-1,6-octadiene, 1,5-cyclooctadiene and 1,4-cyclooctadiene.

DESCRIPTION OF THE PREFERRED EMBODIMENTS

A typical thermosetting unsaturate-resorcinol polymer resin comprising alkylene di-resorcinol units is prepared by slowly adding allyl chloride (3-chloropropene) (0.1 to about 0.7 mole) to an excess (about 1.0 mole) of resorcinol in inert solvent at 100°C. The temperature rises slightly since the reaction is exothermic. Hydrogen chloride evolution is observed as the reaction proceeds. After the addition of allyl chloride is complete, heating of the reaction mixture is continued until HCl evolution ceases. The inert solvent is decanted from the reaction product. Residual solvent and HCl are removed by vacuum stripping. Analysis indicates that essentially no (about 1%) halogen remains in the product and that less than one percent unsaturation remains. The properties of the reaction product indicate that essentially all the hydroxyl radicals of the resorcinol portion of the product remain unchanged, that ether type bonds are absent and that the apparent molecular weight is less than 3000. Molecular weight determinations indicate a range corresponding to polymers containing two and three resorcinol units and a significant proportion of higher polymers. The reaction product is believed to form by polymerization of an alkenyl resorcinol intermediate, the alkylene polymer being terminated by resorcinol. Residual amounts of unreacted resorcinol remaining in the product need not be separated because they have little or no detrimental effect. If a water soluble product is desired after reaction with formaldehyde or resol, it is essential that excess resorcinol be present. The reaction product is still slightly acidic after reaction is completed and it is desirable to neutralize it with a few drops of sodium hydroxide before use. The reaction product can now be used to enhance the bond of cord to rubber.

When added to vinyl-pyridine-styrene-butadiene latex and the cord dipped into the mixture, the reaction product greatly enhances adhesion as compared to cord dipped into the latex alone. Comparable degrees of improvement but much lower absolute values are attained by treating with the reaction product alone. A resorcinol-unsaturate polymer prepared from equal molecular proportions of resorcinol and allyl chloride, ground in a Waring blender in water, washed and dried, is dissolved in acetone to prepare a 10% solution thereof. Polyester cord dipped in the solution gives about 100% improvement in adhesion to rubber as compared to untreated cord.

Alternatively, the reaction product may be further reacted with formaldehyde or resol to form a more highly condensed polymer. After reacting the formaldehyde or resol, the adhesive is dissolved in aqueous ammonium hydroxide and is ready for use as a bonding agent for synthetic fiber to rubber.

Known techniques for treating fiber prior to incorporation into rubber are readily adaptable to the improved adhesive compositions of this invention. Two methods commonly used are usually classified as one dip and two dip systems. In the one dip system, according to this invention, alkylene di-resorcinol is added to a conventional resorcinol-aldehyde-latex composition or to a latex composition alone. The fiber is dipped into the composition, heat treated, incorporated into a rubber stock and vulcanized. The two dip system usually comprises dipping the fiber into an improved adhesive solution followed by a heat treating step. The treated cord is then dipped into a conventional resorcinol-formaldehyde-latex composition followed by yet another heat treating step prior to incorporation into the rubber. Obviously, it is advantageous to use a single dip system if equal bonding is achieved. The reason two dip systems are in use is because of incompatibility of components of the separate dip compositions. The adhesive compositions of this invention function satisfactorily in both systems.

The adhesive compositions of this invention may be applied by dipping, spraying, brushing, rolling or other alternative ways to contact the fiber with the adhesive. The dip method is preferred because present manufacturing facilities are available to perform it.

After application of the adhesive to the cord or fiber, it is advantageous and preferred to heat the treated cord from about one-half minute to 5 minutes in an atmosphere between 250°–500°F. It is not exactly known how the heat treatment improves the adhesion. Besides effecting evaporation of solvent, it is believed that the thermal treatment induces further polymerization of the adhesive composition and promotes bond formation between the adhesive and the fiber itself. A stronger bond between the rubber and reinforcing fiber is achieved when the adhesive coated fiber is heat treated.

The phenol-formaldehyde resols useful as intermediates in this invention are prepared as follows: To a suitable reactor, there is charged a quantity of phenol, a catalytic amount of sodium hydroxide (0.5–5.0 grams) of 50% NaOH solution per mole of phenol; in the examples below 1.75 grams of caustic solution per mole of phenol is used, and 37 or 55 percent aqueous formaldehyde (in the amount to give the desired phenol-formaldehyde ratio). The mixture is heated for about 2 hours between 60°–70°C. The total reaction mixture which is an aqueous solution of resol may be used, without further treatment, to react with the resorcinol/resorcinol polymer mixture. If desired, the resol solution may be neutralized prior to reaction with the resorcinol polymer but preferably the solution is used as is.

Other hydroxy-benzene compounds instead of phenol may be used in the preparation of phenol-aldehyde resols. For example, o, m, or p cresol; o, m, or p chlorophenol preferably p-chlorophenol; xylenols; o, m, or p methoxyphenol; and o, m, or p ethoxyphenol.

The invention is further illustrated by the following examples:

EXAMPLE 1

A conventional adhesive dip formulation is prepared by mixing 11 parts of resorcinol, 32 parts of water, 9.4 parts of 37 percent aqueous formaldehyde, 18 parts of 5 percent aqueous sodium hydroxide which after standing four hours is mixed with 160 parts of about 40% solids polyvinylpyridine-styrene-butadine latex. The emulsion is allowed to stand for a day before use. This preparation is called RFL hereinafter.

EXAMPLE 2

An improved adhesive useful in the practice of this invention is prepared in the following manner.

1320 Grams (12.0 moles) of resorcinol is added to 2000 ml of xylene and agitated while heating to 103°C. 270 Grams (2.16 mole) of 1,4-dichloro-2-butene is added over a 95 minute period. The reaction temperature is between 102° and 116°C during the addition. The reaction mixture is then stirred for 2.5 hours between 123°–128°C. Hydrogen chloride evolution is observed during this time. The agitation is stopped and the reaction mixture allowed to separate into two layers. The top layer which is xylene is removed. The remaining reaction mixture is vacuum stripped at 150°C at 45 mm of mercury to remove residual xylene and hydrogen chloride. The pH is adjusted to 7 or slightly above by the addition of 12 drops of 25% sodium hydroxide solution. A quantity of phenol-formaldehyde resol is added over a period of about one hour in which the temperature drops from about 130° to about 100°C. The reaction mixture is held for another half hour which a solution containing 370 grams of 28 percent ammonium hydroxide in 2568 grams of water is added. The reaction product is a dark amber solution which contains about 44 percent solids when evaporated to dryness. This reaction product is ready for use in the preparation of adhesive dip formulations.

EXAMPLE 3

Another adhesive useful in the practice of this invention is made as described below.

183.6 Grams (2.4 moles) of allyl chloride is added at 105°C over an 80 minute period of 660 grams (6.0 moles) of resorcinol in xylene. The reaction mixture is held with stirring between 110°–120°C for 2 hours. Hydrogen chloride gas evolves during this period. When the gas evolution ceases, the agitation is stopped and the reaction mixture separates into two layers. The xylene layer is removed and the other layer is vacuum stripped to 150°C at 40 mm pressure of mercury. The intermediate product is neutralized by the addition of a few drops of dilute sodium hydroxide solution. Then 1082 grams of resol solution equivalent to 6 moles of phenol and formaldehyde (1/1 phenol/formaldehyde 37%) is added dropwise over a one hour period during which time the temperature falls from about 130° to about 100°C. The solution is stirred for another ½ hour. A solution of 185.4 grams of 28 percent aqueous ammonium hydroxide in 1284 grams of water is added. An amber solution is obtained which can be used directly as an additive for adhesive formulations. Replacing allyl chloride by the same molar amount of allyl alcohol in the presence of mineral acid catalyst gives the same product.

EXAMPLE 4

22.5 Grams (0.18 mole) of 1,3-dichloro-2-butene is added to 110 grams (1.0 mole) of resorcinol in 200 ml of xylene over approximately a one-half hour period between 101°–113°C. The mixture is heated for approximately 4 hours at approximately 120°C. The xylene is removed and the reaction mixture is vacuum stripped for approximately one-half hour at 150°C at 30 mm. Hg to remove residual hydrogen chloride and xylene. After the reaction mixture is neutralized, 86 grams of resol solution equivalent of 0.5 mole phenol and 0.7 mole formaldehyde (1/1.4 phenol/formaldehyde 55%) is added over a 1 hour period, the temperature drops from about 130 to about 100°C. A solution containing 30.9 grams of 28 percent aqueous ammonium hydroxide in 214 ml of water is added. A dark solution ready for use as cord adhesive is obtained.

EXAMPLE 5

Another resin is prepared by following the procedure of Example 4 except 20 grams of 2,3-dichloro propene is used in place of 1,3-dichloro-2-butene and 113 grams of resol solution (1/1.2 phenol/formaldehyde 55%) equivalent to 0.7 mole phenol and 0.84 mole of formaldehyde is used.

EXAMPLE 6

A solution of resin made by the procedure of Example 4 except the xylene solution of resorcinol is first acidified by the addition of anhydrous hydrogen chloride followed by the addition of 56 grams (0.4 mole) of 5,7-dimethyl-1,6-octadiene and only 69 grams of resol solution equivalent to 0.4 mole phenol and 0.48 mole of formaldehyde is reacted.

EXAMPLE 7

A soluble polymeric resin is prepared by the procedure of Example 4 except 30.6 grams (0.4 mole) of a technical mixture of chloropropene is reacted with the resorcinol.

EXAMPLE 8

Another adhesive resin is prepared by the procedure of Example 4 except the xylene solution of resorcinol is first acidified by about 3 grams of HCl and then 22.5 grams (0.2 mole) of 1,7-octadiene is added followed by 77 grams of resol solution (½ phenol/formaldehyde 37%) equivalent to 0.3 mole phenol and 0.6 mole of formaldehyde.

EXAMPLE 9

In this preparation, 36.2 grams (0.4 mole) of methallyl chloride (3-chloro-2-methylpropene) is used in place of 1,3-dichloro-2-butene of Example 5.

EXAMPLE 10

The procedure of Example 5 is followed except 25.0 grams (0.2 mole) 3,4-dichloro-1-butene is reacted to give a dark amber solution.

EXAMPLE 11

The procedure of Example 8 is followed except the diolefin reactant used is 1,5-cyclooctadiene.

EXAMPLE 12

Another modified-resorcinol resol-reaction product is prepared by the procedure of Example 6 except the diolefin reactant is 1,3-pentadiene.

The effect which the adhesive compositions of this invention have upon the bond between synthetic fibers especially polyester, nylon and steel tire cord, and vulcanized rubber is deteremined by measuring the force required to pull a cord treated with the adhesive from vulcanized rubber in which it is embedded. The test is called an H-test and derives its name from the shape of the rubber-cord article formed in the vulcanization mold. The coated or dipped cord is embedded in rubber which is placed in a conventional H-test vulcanization mold having rubber strip channels ⅜-inch wide by 0.1 inch deep and separated from one another by ¼ inch.

The test specimens are placed in the mold and heated at 153°C for 35 minutes to obtain optimum cure. The test specimens are removed, cooled to room temperature and permitted to relax or to set for 24 hours. The specimens are then heated to 100°C. An unaged specimen is one which is heated for 1 hour before the force to separate the cord from the rubber is determined at 100°C. An aged specimen is one which has been heated for 24 hours before measuring at 100°C the strength of the bond between the cord and the vulcanized rubber. The force required to separate a cord from the rubber in an H-test specimen is determined by use of an Instron tensile tester with a jaw speed of the tester moving at the rate of 5 inches per minute.

The following rubber stocks are used to illustrate the adhesion of rubber to polyester tire cord using the adhesives of the invention: Stock A-50 parts natural rubber, 68.8 parts of oil-extended synthetic styrene-butadiene rubber, 50 parts carbon black, 2 parts stearic acid, 3 parts zinc oxide, 1 part sulfenamide accelerator and 2 parts sulfur. Stock B-55 parts natural rubber, 41.25 parts oil-extended synthetic styrene-butadiene rubber, 15 parts polybutadiene rubber, 45 parts carbon black, 1.5 parts stearic acid, 5 parts zinc oxide, 5 parts extender oil, 5 parts precipitated silica, 2 parts tackifier, 1 part resorcinol, 1 part hexa kis(methoxymethyl)-melamine, 2.5 parts unsoluble sulfur, 1.5 parts polymerized 1,2-dihydro-2,2,4-trimethylquinoline, 0.8 part 2,2'-benzothiazolyl disulfide, 0.3 part N-tert-butyl-2-benzothiazolesulfenamide and 0.2 part N-(cyclohexylthio)phthalimide.

Dip adhesive compositions, hereinafter called Dip 1, are prepared by mixing 7.6 parts adjuvant, 21.9 parts water and 18 parts RFL described in Example 1. The adjuvants used are the reaction product of a resorcinol/resorcinol polymer mixture (comprising the reaction product of allyl chloride and resorcinol as described in Example 3) and various resol solutions prepared using the amount of reactants indicated for each mole of resorcinol charged for making the polymer (the number average molecular weight of the products excluding unreacted resorcinol and phenol is between 900–1300).

Other single dip adhesive compositions, hereinafter called Dip 2, are prepared by mixing 6.1 parts of adjuvant as described above, 18 parts of about 40% solids vinyl-pyridine-styrene-butadiene terpolymer latex and 23.9 parts water. The adhesive compositions so formulated may be used without aging. Polyester 1000/3 tire cord is dipped into the dip compositions at the rate of 52 inches per minute. The dipped cord is heat treated for 3 minutes at 450°F. The treated cord is then embedded in H-test specimens and tested as previously described. The force required to separate the cord from the vulcanized rubber is shown in Table I.

Table 1

| Adhesive Moles/Mole Resorcinol | | H-adhesion, lbs. unaged | | | |
| Phenol | Formaldehyde | Stock A | | Stock B | |
| | | Dip 1 | Dip 2 | Dip 1 | Dip 2 |
|---|---|---|---|---|---|
| .53 | .74 | 27.2 | 27.1 | 32.0 | 30.4 |
| .46 | .65 | 25.8 | 26.1 | 30.8 | 31.8 |
| .46 | .65 | 27.0 | 24.2 | 31.5 | 31.7 |
| .58 | .70 | 24.8 | 27.3 | 31.7 | 30.5 |
| .63 | .76 | 26.8 | 22.7 | 29.5 | 30.4 |
| .8 | .8 | 27.2 | 28.0 | 33.7 | 31.7 |
| .52 | .63 | 27.7 | 21.1 | 31.1 | 31.7 |
| .46 | .65 | 27.0 | 26.4 | 25.7 | 30.6 |
| .7 | .84 | 27.7 | 20.5 | 31.9 | 28.1 |
| .6 | .84 | 28.4 | 19.5 | 29.1 | 25.1 |
| .9 | .9 | 24.9 | 21.1 | 27.8 | 24.0 |
| Control | | 25.4 | 23.3 | 34.0 | 30.8 |

The control sample is an adhesive prepared by reacting 0.38 moles of formaldehyde with the resorcinol/resorcinol polymer mixture as described in Example 3.

The polymers of this invention can be used to improve adhesion of treated fibers to diene rubber. Diene rubber includes both natural and synthetic rubber. Illustrative examples of synthetic rubbers which may be used in this invention include cis-4-polybutadiene, butyl rubber, ethylene-propylene polymers, polymers of 1,3-butadiene, polymers of isoprene and copolymers of 1,3-butadiene with other monomers, such as styrene, acrylonitrile, isobutylene and methyl methacrylate.

Although formaldehyde is used to illustrate the invention and is preferred, it is understood that the other aldehydes are suitable for the practice of the invention. The saturated aliphatic aldehydes having straight or branched chains of 1 to 6 carbon atoms are applicable. The unbranched lower alkyl aldehydes of 1 to 4 carbon atoms are an important subgroup; examples of which are acetaldehyde, propionaldehyde and butyraldehyde. The cyclic aldehydes and polymerized aldehydes such as paraformaldehyde and paraldehyde may also be used.

The adhesives or adhesive adjuvants of this invention may be applied to fibers other than those particularly mentioned above to aid in bonding fibers or rubbers. Other fibers which can be employed in the practice of the invention include, but are not limited to, cotton, wool, wood cellulose, glass, aluminum, copper, tin, steel, brass plated steel and aluminumsteel alloys. For example, the preparation of aluminum-steel alloy fibers and stainless steel fibers useful for making reinforced rubber articles to which fibers the adhesive of adhesive adjuvants of this invention may be applied is described in British Pat. No. 1,153,577, May 29, 1969. The individual metal filaments are about 3-6 mils in diameter and are usually twisted into strands and then converted to metal cord or cable for reinforcing flexible rubber articles. The composition of a typical steel alloy comprises 0.5–3.0 percent aluminum and 0.1–1.5 percent carbon. If desired the metal cord is treated with a metal primer prior to applying the adhesives of this invention. Alternatively, water soluble primers are added directly to the adhesive composition and applied as a single dip.

For metal-rubber adhesion the adhesive adjuvants are generally used in combination with a rubber latex. Vinyl-pyridine latexes appear to be particularly advantageous but natural and synthetic rubber latexes are also useful. Adhesion values from 30 lbs. to above 50 lbs. can be obtained in the "H" test depending upon the cleanliness of the metal surface, composition of the adhesive composition, relative amounts of each component, the thermosetting conditions to which the treated cord is subjected and the composition of the rubber stock itself.

For consistent performance, the adhesive is deposited upon a clean metal surface. The metal surface may be cleaned mechanically, chemically or by combination mechanical-chemical treatment. The procedure used depends upon the nature of the surface contamination. If the surface is contaminated with dust, dirt, lint and other extraneous material due to an unclean environment, sometimes simply wiping is adequate. If the surface is covered with oils, greases and organic materials, liquid or vapor degreasing is recommended. When scale or films on the surface is a problem, treatment with either acid or alkaline solutions or both may be required to provide a clean surface. Although adequate adhesion is usually obtained without any cleaning of the metal surface, cleaning is preferred as a precautionary measure to assure uniformly good results and to eliminate adhesion failure due to accidental contamination of the metal surface.

The ratio of components in adhesive compositions for treating metal surfaces may be varied and good metal-rubber adhesion achieved. The major component is water with the balance comprising rubber latex, adhesive adjuvant, and if desired, one or more other additives such as metal primer, antioxidant and wetting agent. For example, the total percent solids of the adhesive composition (the amount of residue of both soluble and insoluble components obtained upon evaporation of the water) may range from 20–40%. Preferably, the solid content is between 25–35%. Of course, it is understood that the invention is not limited to any particular solids content and that the above ranges are merely illustrative of typical formulations which give good adhesion. The total solid content of the composition generally comprises 30–75% elastomer from latex, preferably 40–60% and 20–60% adjuvant of this invention preferably 30–40%. Lower amounts of adjuvant, preferably no lower than 10%, may be used when the composition contains other additives. The amount of each for optimum adhesion varies somewhat depending upon the type latex and adjuvant used.

The metal cord is cleaned by dipping into an alkaline solution at 60°C for about one-half minute and then rinsed in water for about one-half minute. The cleaning solution comprises about a 5% sodium carbonate solution containing a small amount of a detergent. After cleaning but before the cord dries, it is dipped into the adhesive compositions. It is important to cover the metal surface as soon as possible since the clean metal is highly active and readily rusts upon standing. After the cord is dipped in the adhesive composition, the coated cord is heated as described previously. A steel cord, whether cleaned or not, when dipped into the adhesive composition and subsequently heat treated absorbs solids between about 1–4% by weight of the cord. The adhesive coating is flexible and strongly adherent and the steel cord-adhesive assembly is stable to conventional handling conditions and incorporation into elastomeric matrix.

To illustrate adhesion of metal tire cord to a matrix, a rubber composition containing the following ingredients is compounded where all parts are by weight. 100 Parts natural rubber, 50 parts HAF carbon black, 5 parts zinc oxide, 3 parts stearic acid, 3 parts hydrocarbon softener, 2 parts tackifier, 2.5 parts polymerized 1,2-dihydro-2,2,4-trimethyl-quinoline, 3 parts insoluble sulfur, 0.8 part 2-(morpholinothio)benzothiazole and 0.5 part N-(cyclohexylthio)phthalimide. The coated cords are heated for 2 minutes at 212°F and then for 4 minutes at 356°F and embedded in said rubber composition and the composite is placed in an H-test vulcanization mold as previously described, cured for 30 minutes at 153°C and the force required to separate the cord from the rubber is determined as before. Typical results obtained for cleaned aluminum-steel alloy 4 × 7 × 0.004 cord comprising 28 individual 4 mil diameter filaments in the form of a cable of 4 strands of 7 filaments each are shown in Table II. The dip compositions are prepared by mixing 8 parts of the reaction product described above in Table I, 15 parts of vinyl-pyridine styrene-butadiene terpolymer latex and 12.0 parts water.

Table II

| Adhesive Moles/Mole Resorcinol | | Steel Adhesion H-test, lbs. | |
|---|---|---|---|
| Phenol | Formaldehyde | Unaged | Aged |
| .30 | .64 | 49.9 | 44.6 |
| .46 | .6 | 46.1 | 46.2 |
| .53 | .74 | 56.2 | 51.5 |
| .58 | .7 | 42.8 | 36.9 |
| .63 | .76 | 47.5 | 49.1 |
| .70 | .84 | 48.6 | 50.2 |
| .76 | .92 | 51.0 | 52.1 |
| .8 | .8 | 51.2 | 45.2 |
| .9 | .9 | 49.1 | 48.4 |
| 1.0 | 1.0 | 34.9 | 44.7 |
| 1.0 | 0.8 | 39.1 | 33.9 |
| 1.3 | 1.3 | 23.2 | 21.6 |

Table II-continued

| Adhesive Moles/Mole Resorcinol | | Steel Adhesion H-test, lbs. | |
|---|---|---|---|
| Phenol | Formaldehyde | Unaged | Aged |
| Control* | | 41.3 | 51.1 |

*Control the same as Table I

It is understood that the fiber may be treated sequentially with primer, adhesive and latex, or with primer and a combination of adhesive and latex, or if desired, a combination comprising primer, adhesive and latex. Generally, to eliminate processing steps, it is convenient to treat the fiber in one step by using a combination of adhesive and latex, or a combination of primer, adhesive and latex.

EXTENDED DISCLOSURE

For the practice of this invention, any olefinic reactant which introduces an unsaturated radical of 3–10 carbon atoms into the nucleus of the resorcinol which unsaturated radical further condenses producing saturated resorcinol polymer having alkylene bridges of at least two carbon atoms is suitable. In addition to unsaturates previously disclosed, suitable unsaturate-resorcinol polymers characterized by resorcinol units connected by alkylene bridges may also be prepared by the acidic condensation of resorcinol and olefinic alcohols or olefinic alcohol precursors. Branched or unbranched olefinic alcohols of 3 to 10 carbon atoms having at least two reactive sites are satisfactory. A difunctional alcohol is an alcohol having one hydroxy radical as one reactive site and an olefinic bond as the other. A trifunctional alcohol may have either two hydroxy radicals and one olefinic bond or one hydroxyl radical and two olefinic bonds. It is believed that the unsaturate-resorcinol polymers are the same regardless of whether the alkylene bridge is derived from a haloolefin, diolefin or an olefinic alcohol. Representative examples of unsaturated alcohols which are satisfactory unsaturate reactants are allyl alcohol, methallyl alcohol, crotyl alcohol (2-buten-1-ol), cinnamyl alcohol, 1,5-dimethyl- 4-hexen-1-ol, 1-methyl-2-buten-1-ol, 3-hexen-1-ol, 4,6-dimethyl-1-hepten-4-ol, 3-octen-1-ol, 2,2-dimethyl-3-hexen-1-ol, 3,7-dimethyl-6-octen-1-ol, 3,7-dimethyl-2,6-octadiene-1-ol, 3,7-dimethyl-1,6-octadiene-3-ol and 3(4-hydroxy-3-methoxy-phenyl)-2-propen-1-ol(coniferyl alcohol).

The term olefinic alcohol precursor means unsaturated esters or unsaturated ethers which upon acid hydrolysis yield olefinic alcohols. Formate, acetate, propionate and butyrate esters of any of the above illustrated unsaturated alcohols are satisfactory, for example, allyl formate, allyl acetate, allyl propionate, methallyl acetate, crotyl acetate, and the like. Symmetrical and unsymmetrical ethers are satisfactory provided that the ether gives two moles of the same or different unsaturated radical when introduced into the resorcinol nucleus. Illustrative examples of satisfactory ethers are allyl ether, bis(2-methylallyl)ether, allyl-3-methyl-3-butenyl ether and 2-butenyl-1-methylallyl ether. It is understood that the invention is not limited to the unsaturate reactants disclosed for illustrative purposes but that the invention is applicable to any olefinic alcohol of 3 to 10 carbon atoms or olefinic alcohol precursor which yields said alcohols of 3 to 10 carbon atoms. Further examples would only unduly extend the disclosure without contributing to a better understanding of the invention. Many olefinic alcohols and alcohol precursors are known and may be readily found in the literature.

The mole ratio of unsaturate-to-resorcinol is the same for olefinic alcohols and alcohol precursors as other unsaturate reactants previously discussed. When producing water soluble products the ratio of difunctional alcohols to resorcinol may be larger than when a trifunctional alcohol is the unsaturate. And as before, in the preparation of resins which remain water soluble after reaction with formaldehyde or resol the unsaturate-resorcinol ratio is 0.1-0.6 mole per mole resorcinol. When using trifunctional and higher molecular weight unsaturates preferably the ratio is within the range of 0.1-0.3. For polymers with allyl bridging groups, the preferred amount of phenol in the resol is between 0.4 to 1.4 mole for each mole of resorcinol charged. It is understood that there is some overlapping of the range of reactant ratios of resol and unsaturate in which water insoluble products are obtained. As the amount of unsaturate decreases, larger amounts of resol may be reacted and water soluble resins are still obtained.

It will be appreciated that the solubility of the alkylene di-resorcinol polymer and the resol condensate is dependent upon molecular weight. The molecular weight of the polymer varies according to the amount of unsaturate condensed to form the alkylene bridged resorcinol. As expected, when the amount of unsaturate increases higher molecular weight polymers are obtained. The molecular weights are determined by Gel Permeation Chromatography using four 3-ft. × ⅜-inch diameter Poragel columns (2-500A, 100A, and 60A) and tetrahydrofuran solvent. The molecular weights are those of the polymer or condensate and do not include species below an apparent molecular weight of 300. If the number average molecular weight of the polymer exceeds 800 and the weight average molecular weight exceeds 1200 water insoluble resins are obtained when condensed with resol. The number average molecular weight of alkylene resorcinol polymer conducive to the formation of water soluble adhesive is between 450-750, with the range of 500-650 being preferred and the weight average molecular weight is between 500-1200 with the range of 700-900 being preferred.

After condensation with resol, water soluble condensates generally have the number average molecular weight between 700-1800 with the range of 800-1300 being preferred and have the weight average molecular weight between 900-10,000 with the range of 1500-4500 being preferred. Better adhesion is obtained with condensates having higher molecular weights. As already explained, the proper molecular weight condensates are obtained by controlling the mole ratio of unsaturate and resol condensed. The preparation of unsaturate-resorcinol polymers from olefinic alcohols and precursors are illustrated below.

EXAMPLE 13

A reactor equipped with heating and stirring means is charged with 110 grams of resorcinol, 5 ml of water and 0.5 grams of concentrated sulfuric acid. After heating the mixture to 110°C allyl alcohol (23.2 g) is added slowly over a period of 35 minutes during which time the temperature drops to 105°C. The mixture is heated with stirring at 105°-120°C for about 3 hours. Dilute sodium hydroxide solution (2 g of 1.0% solution) is added to neutralize the acid. Then 180.3 grams of resol solution equivalent to one mole of phenol and formaldehyde (1/1 mole ratio of phenol and 37% aqueous formaldehyde) is added dropwise over a 1-hour period during which time the temperature falls from about 120° to 100°C. After one-half hour, an ammonium hydroxide solution prepared by dissolving 30.6 grams of concentrated $NH_4OH$ in 214 ml of water is added. A dark solution is obtained which solution is suitable for use in the preparation of adhesive formulations. The procedure is repeated omitting the caustic neutralization step of the acid catalyst; the product has a slightly lower molecular weight but gives essentially the same adhesive values.

EXAMPLE 14

Allyl acetate (40 g) is added dropwise over a period of 50 minutes at a temperature of 108°-125°C to a mixture comprising 110 grams of resorcinol, 5 ml of water and 0.5 g of concentrated sulfuric acid. The mixture is stirred and heated at about 120°C for 7 hours. The mixture is vacuum stripped at 150°C at 16 mm Hg to remove the by-product acetic acid (a 28 gram loss in weight is observed). Then 113 grams of resol solution (1/1.2 moles phenol/formaldehyde, 55%) equivalent to 0.7 mole phenol and 0.84 mole of formaldehyde is added dropwise at 120°C over a 0.5 hour period. During the addition the temperature gradually drops to 100°C. The solution is held for ½ hour after which a solution containing 30.6 grams of concentrated $NH_4OH$ in 214 grams of water is added. The product is a dark solution.

EXAMPLE 15

A reactor charged with 110 grams of resorcinol is heated to 100°C. The acid catalyst is added (1.0 g Conc. $H_2SO_4$) and allyl ether (19.6 grams, 0.2 mole; equivalent to 0.4 mole of allyl alcohol) is added dropwise over a period of 28 minutes while maintaining the temperature between 107°-121°C. The mixture is stirred between 112°-123°C for about 1¾ hours. Resol solution (86 grams) equivalent to 0.5 mole phenol and 0.7 mole formaldehyde (1/1.4 phenol/formaldehyde, 55%) is added over a 1 hour period. The temperature drops from about 120° to about 100°C. The mixture is held for one-half hour at about 100°C after which a solution containing 30.8 grams of concentrated $NH_4OH$ in 214 grams of water is added. A yield of about 455 grams of adhesive solution is obtained.

EXAMPLE 16

A reactor is charged with 110 grams of resorcinol, 200 ml of xylene and 2.5 grams of anhydrous HCl. After heating to 100°C, 30.8 grams of geraniol is added dropwise over 55 minutes. The mixture is heated between 104°-120°C for about 3 hours. The xylene is decanted and the residual xylene is removed by vacuum stripping at 170°C at 10 mm Hg. Fifteen drops of 10% sodium hydroxide is added to neutralize the acid catalyst. Resol solution (113 grams) equivalent to 0.7 mole phenol and 0.84 mole of formaldehyde (1/1.2 moles phenol/formaldehyde, 55%) is added over a 0.5 hour period during which time the temperature drops from 125° to 100°C. The mixture is heated for another hour at 90°-95°C. A solution containing 30.9 grams of concentrated $NH_4OH$ in 214 grams of water is added to yield about 475 grams of a dark amber solution.

The soluble saturated resorcinol polymer prepared via mono-olefinic alcohol or alcohol precursors in Examples 13, 14 and 15 give essentially identical NMR and Infrared spectral patterns as the polymers prepared via halo-olefin unsaturates, providing, of course, the unsaturates give the same bridging group. NMR analyses show at 1.1–1.5 ppm 2.2–3.2 mmoles of methyl groups per gram of sample depending upon the amount of unsaturate reacted. The IR measurements are made on films of the materials cast from solutions on NaCl disks using a Perkin-Elmer Model 621 IR Spectrophotometer; slit program, 1000; scan speed, 1.9 inches/min.; attenuator speed 1480 and suppression 3. The absorbance of 3330 cm$^{-1}$ is corrected by subtracting the baseline at 3700 cm$^{-1}$. The absorbance at 1600 cm$^{-1}$ and 1455 cm$^{-1}$ is corrected by subtracting the absorbance at 1540 cm$^{-1}$ from each. The aliphatic to aromatic ratio measured at 1455 cm$^{-1}$ and 1600 cm$^{-1}$, respectively, is 0.45 ± 0.1 and the hydroxy to aromatic ratio measured at 3330 cm$^{-1}$ and 1600 cm$^{-1}$, respectively, is 1.0 ± 0.15. No carbonyl bands are observed which indicate that on oxidation of the polymer occurs during the synthesis.

Adhesion tests, conducted as described in Tables I and II give results with allyl alcohol and allyl alcohol precursor products similar to those obtained with resins prepared with allyl chloride.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. The method of enhancing adhesiveness of fiber to rubber which comprises treating the fiber with an adhesive composition comprising the conjoint condensate of (1) resorcinol, (2) essentially saturated resorcinol polymer comprising alkylene nuclear di-resorcinol units, (1) and (2) being the condensation product mixture of resorcinol and said polymer resulting from introducing olefinic unsaturated radical of 3–10 carbon atoms into the resorcinol nucleus within the range of about 0.1 to 0.6 mole of unsaturated radical per mole of resorcinol charged, and (3) a resol, said resol being the condensation product of 0.5–3.0 mole of formaldehyde and one mole of phenol, the conjoint condensate being obtained by heating said condensation product mixture and such amount of the resol as to provide up to but not to exceed 1.4 moles of either phenol or formaldehyde per mole of resorcinol charged in making said mixture.

2. The method of claim 1 wherein the source of the unsaturated radical is an unsaturate selected from the group consisting of (1) halo-olefin, (2) di-halo-olefin, (3) acyclic or cyclic diolefin and (4) olefinic alcohol or olefinic alcohol precursor.

3. The method of claim 2 wherein the resol is the condensation product of phenol and 0.7–2.5 moles of formaldehyde per mole of phenol.

4. The method of claim 3 wherein the resol is the product of 0.8–1.4 moles of formaldehyde per mole of phenol.

5. The method of claim 4 wherein the olefinic unsaturated radical is allyl.

6. The method of claim 2 wherein the unsaturate is selected from the group consisting of 3-chloropropene, 1,4-dichloro-2-butene, 2,3-dichloropropene, 3,4-dichloro-1-butene, 5,7-dimethyl-1,6-octadiene,1,3-penadiene and 1,5-cyclooctadiene.

7. The method of claim 6 wherein the resorcinol and polymer are the reaction product of resorcinol and 0.3–0.5 mole of 3-chloropropene per mole of resorcinol.

8. The method of claim 4 wherein the adhesive composition contains vinyl-pyridine latex.

9. The method of claim 2 wherein the source of the unsaturated radical is an unsaturate selected from the group consisting of allyl alcohol, allyl acetate, and allyl ether.

10. The method of claim 4 wherein the adhesive composition contains resorcinol-formaldehyde-latex.

11. The method of claim 2 wherein the fiber is selected from the group consisting of polyester, nylon, rayon, wood-cellulose, steel and aluminum-steel alloy.

12. The method of claim 11 whrein the fiber is aluminum-steel alloy.

13. A fiber treated with an adhesive composition comprising the conjoint condensate of (1) resorcinal, (2) essentially saturated resorcinol polymer comprising alkylene nuclear di-resorcinol units (1) and (2) being the condensation product mixture of resorcinol and said polymer resulting from introducing olefinic unsaturated radical of 3–10 carbon atoms into the resorcinol nucleus within the range of about 0.1 to 0.6 mole of unsaturated radical per mole of resorcinol charged, and (3) a resol, said resol being the condensation product of 0.5–3.0 mole of formaldehyde and one mole of phenol, the conjoint condensate being obtained by heating said condensation product mixture and such amount of the resol to provide up to but not to exceed 1.4 moles of either phenol or formaldehyde per mole of resorcinol charged in making said mixture.

14. The fiber of claim 13 wherein the source of the unsaturated radical is an unsaturate selected from the group consisting of (1) halo-olefin, (2) dihalo-olefin, (3) acyclic or cyclic diolefin and (4) olefinic alcohol or olefinic alcohol precursor.

15. A fiber of claim 14 wherein the resol is the condensation product of phenol and 0.7–2.5 moles of formaldehyde per mole of phenol.

16. A fiber of claim 15 wherein the resol is the product of 0.8–1.4 moles of formaldehyde per mole of phenol.

17. A fiber of claim 14 wherein the unsaturate is selected from the group consisting of 3-chloropropene, 1,4-dichloro-2-butene, 2,3-dichloropropene, 3,4-dichloro-1-butene, 5,7-dimethyl-1,6-octadiene, 1,3-pentadiene and 1,5-cyclooctadiene.

18. A fiber of claim 17 wherein the resorcinol and polymer are the reaction product of resorcinol and 0.3–0.5 mole of 3-chloropropene per mole of resorcinol.

19. The fiber of claim 16 wherein the unsaturated radical is allyl.

20. The fiber of claim 14 wherein the source of the unsaturated radical is an unsaturate selected from the group consisting of 3-chloropropene, allyl alcohol, allyl acetate and allyl ether.

21. A fiber of claim 16 wherein the adhesive composition contains vinyl-pyridine latex.

22. A fiber of claim 16 wherein the adhesive composition contains resorcinol-formaldehyde-latex.

23. A fiber of claim 14 wherein the fiber is selected from the group consisting of polyester, nylon, rayon, wood-cellulose, steel, brass-plated steel and aluminum-steel alloy.

24. A fiber of claim 23 wherein the fiber is aluminum-steel alloy.

25. The method of enhancing adhesiveness of fiber to rubber which comprises treating the fiber with an adhesive comprising the conjoint condensate of (1) resorcinol, (2) essentially saturated alkenyl-resorcinol polymer comprising alkylene bridged resorcinol units wherein the resorcinal nuclei are attached to different carbon atoms of an alkylene radical of 2 to 8 carbon atoms in the chain between the nuclei and (3) a resol, said resol being the condensation product of 0.5–3.0 mole of formaldehyde and one mole of phenol, the conjoint condensate being obtained by heating (1) and (2) with such amount of said resol as to provide up to but not to exceed 1.4 moles of either phenol or formaldehyde per mole of resorcinol in (1) and (2).

26. The method of claim 25 wherein the polymer is allyl-resorcinol polymer.

27. A fiber treated with an adhesive comprising the conjoint condensate of (1) resorcinol, (2) essentially saturated alkenyl-resorcinol polymer comprising alkylene bridged resorcinol units wherein the resorcinol nuclei are attached to different carbon atoms of an alkylene radical of 2 to 8 carbon atoms in the chain between the nuclei and (3) a resol, said resol being the condensation product of 0.5–3.0 mole of formaldehyde and one mole of phenol, the conjoint condensate being obtained by heating (1) and (2) with such amount of said resol as to provide up to but not to exceed 1.4 moles of either phenol or formaldehyde per mole of resorcinol in (1) and (2).

28. The fiber of claim 27 wherein the polymer if allyl-resorcinol polymer.

29. The method of claim 2 wherein the resol is the condensation product of formaldehyde and phenol or substituted phenol wherein the substituents are methyl, chloro, methoxy or ethoxy.

30. The method of claim 29 wherein the resol is the condensation product of substituted phenol and 0.7–2.5 moles of formaldehyde per mole of substituted phenol.

31. The method of claim 30 wherein the resol is the product of 0.8–1.4 moles of formaldehyde per mole of substituted pnenol.

32. The fiber of claim 14 wherein the resol is the condensation product of formaldehyde and phenol or substituted phenol wherein the substituents are methyl, chloro, methoxy or ethoxy.

33. The fiber of claim 32 wherein the resol is the condensation product of substituted phenol and 0.7–2.5 moles of formaldehyde per mole of substituted phenol.

34. The fiber of claim 33 wherein the resol is the product of 0.8–1.4 moles of formaldehyde per mole of substituted phenol.

35. The method of claim 1 which comprises the further step of heating the treated fiber between 250°–500°F for about one-half minute to 5 minutes.

36. The method of claim 9 which comprises the further step of heating the treated fiber between 250°–500°F for about one-half minute to 5 minutes.

37. The method of claim 26 which comprises the further step of heating the treated fiber between 250°–500°F for about one-half minute to 5 minutes.

38. The method of claim 35 which comprises the further step of contacting the treated cord to rubber and vulcanizing the resulting composite to effect adhesion.

39. The method of claim 36 which comprises the further step of contacting the treated cord to rubber and vulcanizing the resulting composite to effect adhesion.

40. The method of claim 37 which comprises the further step of contacting the treated cord to rubber and vulcanizing the resulting composite to effect adhesion.

* * * * *